United States Patent

[11] 3,543,882

[72] Inventor Jens A. Paasche
Wilmette, Illinois (1909 Diversey Parkway, Chicago, IL 60614)
[21] Appl. No. 753,464
[22] Filed Aug. 19, 1968
[45] Patented Dec. 1, 1970
[73] Assignee Continental Illinois National Bank & Trust Company of Chicago
Executor of the estate of said Paasche, deceased

[54] AUTOMATIC LUBRICATING APPARATUS
13 Claims, 6 Drawing Figs.
[52] U.S. Cl. .................................................. 184/15, 184/55
[51] Int. Cl. ...................................................... F01m 1/08; F16n 7/24
[50] Field of Search ........................................... 184/15, 15A, 3, 3A, 55, 55A, 56A

[56] References Cited
UNITED STATES PATENTS
| | | | |
|---|---|---|---|
| 1,840,934 | 1/1932 | Craig et al. ..................... | 184/15 |
| 2,848,068 | 8/1958 | Abbott et al. .................. | 184/15 |
| 2,850,323 | 9/1958 | Veres ............................ | 184/55X |
| 2,868,584 | 1/1959 | Faust ............................ | 184/55UX |
| 3,031,033 | 4/1962 | Burrows ....................... | 184/15 |
| 3,053,371 | 9/1962 | Fischer ......................... | 184/15X |
| 3,155,192 | 11/1964 | James ........................... | 184/15 |

Primary Examiner—Manuel A. Antonakas
Attorney—Olson, Trexler, Wolters & Bushnell ABSTRACT: Automatic lubricating apparatus for use with a conveyor system such as an air-coating apparatus, in lubricating moving parts thereof, such as, for example rotating article support spindles and bearings thereof, including a micrometer adjusted air gun mounted adjacent the air coating apparatus and connected to a reservoir of lubricant, and a trigger mechanism mounted adjacent the apparatus in the path of the moving spindles, preceding the automatic lubricating air gun. The trigger mechanism is connected to the air gun and a source of pressurized air. Upon engagement of the trigger mechanism by a first moving spindle, a low-pressure quantity of atomized oil is applied onto a second spindle which has assumed a position adjacent the air gun. Because of the micrometer control of both the consistency of the air and oil quantity, all the oil is utilized in the lubrication of each of the spindles with little, if any, excess permeating the atmosphere thereabout.

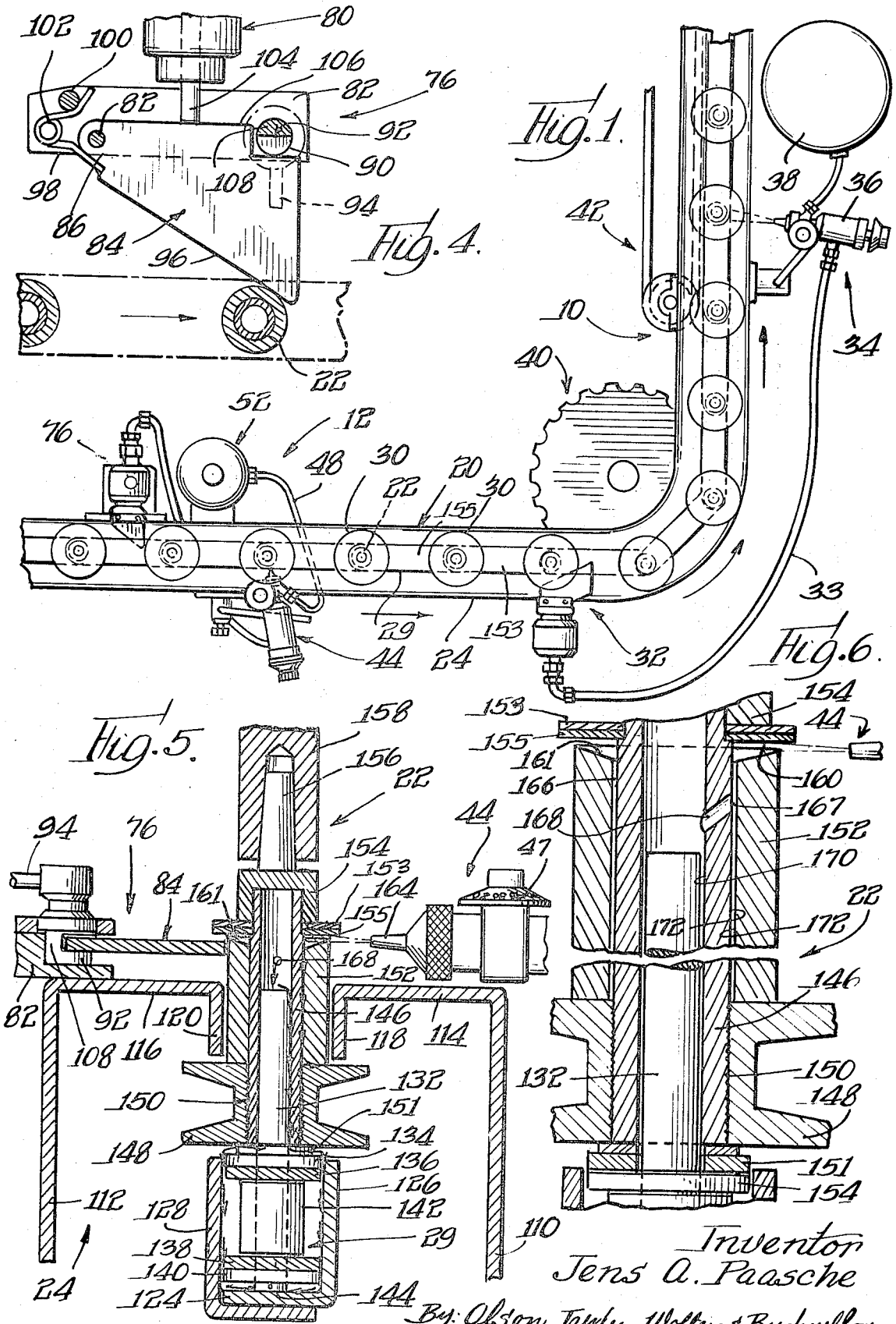

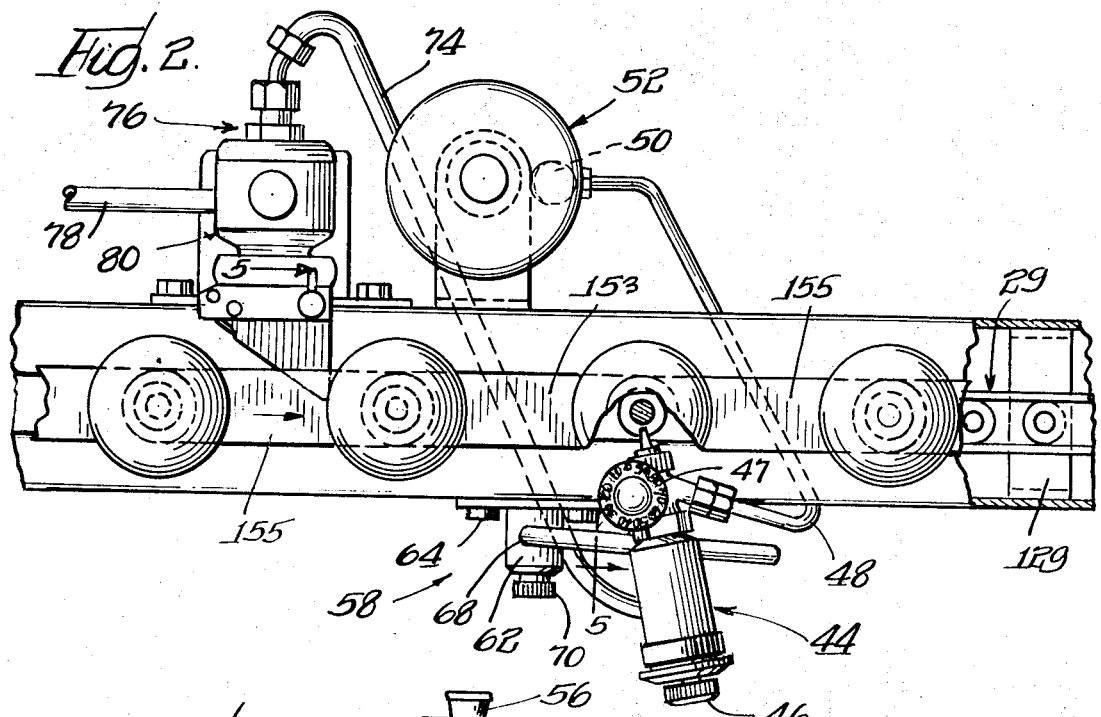
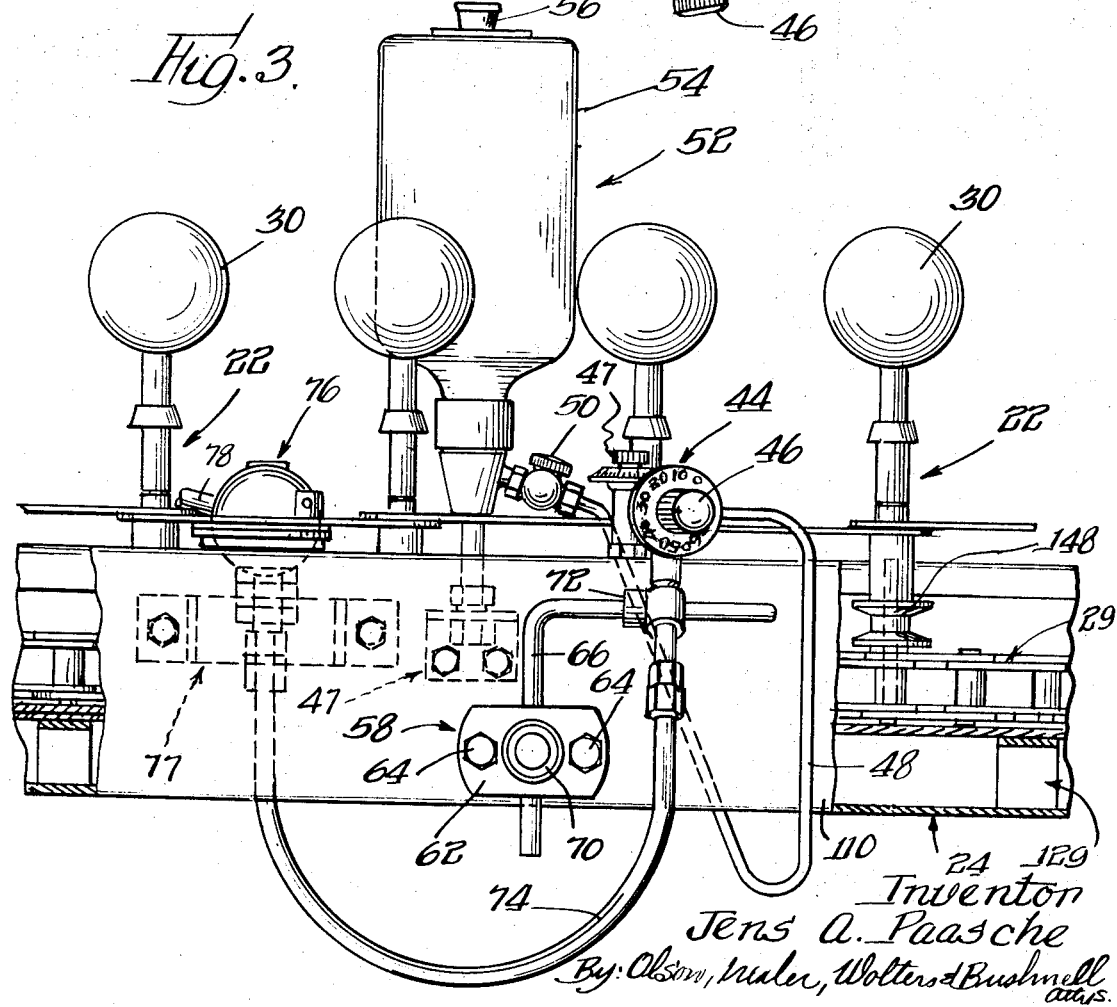

3,543,882

AUTOMATIC LUBRICATING APPARATUS

BACKGROUND OF THE INVENTION

The present invention relates generally to lubrication devices and more particularly to automatic oiling devices.

In apparatus of the type which passes articles to be coated before an air gun assembly, such as, for example, as shown in U.S. Pat. No. 2,781,738, the many spaced-apart rotatable spindles or supports which carry articles to be coated with paint or the like, the bearings thereof and the chain conveyor which transports the spindles, must each be lubricated periodically so that they will function satisfactorily. The lubrication of these spindles or supports is presently being accomplished manually. This means that the conveyor and air coating apparatus must be shut down and that each spindle must be lubricated individually. Not only does this stifle production of the air-coated articles, but it results in an added labor expense and a loo loss of time.

SUMMARY OF THE INVENTION

Accordingly, it is a general object of the present invention to provide a new and improved lubricating device for the spindles or article supports, etc., of air-coating apparatus of the above-described type, which overcomes the disadvantages of the prior art lubricating techniques.

It is a more specific object of this invention to provide a new and improved lubricating device for automatically lubricating conveyor parts of an air-coating apparatus such as that described above, without requiring the shutdown of the system.

It is yet another specific object of this invention to provide a fully automatic lubricating device which properly directs a micrometer controlled, predetermined quantity of oil onto the spindles or article supports of an air-coating apparatus such as described heretofore, to fully lubricate each bearing surface of each of the spindles and the conveyor chain transporting the spindles while the system is in operation.

DESCRIPTION OF THE DRAWINGS

A better understanding of the present invention and its organization and construction may be had by referring to the description below in conjunction with the accompanying drawings, wherein:

FIG. 1 is a fragmentary, top elevational view of an air depositing or coating apparatus incorporating an automatic lubricating device according to the invention;

FIG. 2 is an enlarged top elevational view of the automatic lubricating device of FIG. 1;

FIG. 3 is a side elevational view of the automatic lubricating device of FIG. 2;

FIG. 4 is an enlarged top plan view of a trigger cam mechanism which serves to operate the automatic lubricating device according to the invention;

FIG. 5 is an enlarged view in vertical section illustrating a single rotatable support spindle of the conveyor portion of the air-coating apparatus of FIG. 1 and the manner in which the automatic lubricating device operates to lubricate the spindle and conveyor chain used to transport the spindle; and FIG. 6 is an enlarged fragmentary view of the spindle of FIG. 5 illustrating the travel of the lubricating oil there about after having been lubricated by the automatic lubricating device according to the invention.

DETAILED DESCRIPTION

Referring now to the drawings and particularly to FIG. 1, there is shown an air-coating apparatus 10 incorporating an automatic lubricating or oiling device 12 according to the invention. The air-coating apparatus will be described in general herein, however, for a more detailed description of a similar apparatus, reference is made to U.S. Pat. No. 2,781,738.

Briefly, the air-coating apparatus 10, as shown in FIG. 1, includes a conveyor system generally indicated by the number 20, which includes a plurality of removable support spindles, each designated by the numeral 22. The conveyor system, only a portion of which is shown, is continuous and supported by a frame, generally designated by the numeral 24. Articles, such as 30, shown here as tree ornaments, but which may almost anything which requires a paint or the like coating, are positioned on the spindles 22, one per spindle. The articles are carried about conveyor system 20, past a trigger unit or dog 32 and then to an air-coating station 34. Positioned at air-coating station 34 is at least one air gun 36 connected by an air line 33 to the unit 32, and a reservoir 38 for supplying gun 36 with paint or the like which is used to coat the articles 30. The conveyor system includes a chain conveyor 29 which is operated by a motor driven sprocket wheel 40 located at the corner of the apparatus, and a driven belt arrangement 42 located at the side of the conveyor 20 opposite the air-coating station 34. The belt arrangement 42 serves to engage the spindles as they pass the coating station to rotate them so that the article 30 is coated thoroughly and completely about the entire surface thereof. In addition, the air gun may be synchronized with an article passing thereby, and be moved along with the article while the latter is being coated. This insures a thorough application of coating material to the article.

The automatic lubricating device 12 according to the invention comprises an automatic air gun 44 of the well known type, mounted at one side of the conveyor 20. The air gun 44 includes a micrometer control knob 46 for minutely adjusting the volume of the lubricant emanating from the air gun to insure that a correct amount of lubricating oil is provided to each spindle 22, and a micrometer adjusting needle control knob 47 for adjusting minutely the consistency of the atomized lubricant leaving the air gun. The air gun 44, as can be seen in FIGS. 2 and 3, is connected by a tubular line 48 to a valve mechanism 50, which itself is connected to a lubricating oil reservoir 52. The reservoir 52 includes a container or bottle 54 having a capped fill opening 56 in the upper wall thereof, and is mounted on the frame 24 of the conveyor at the side thereof opposite the air gun 44 by means of a bracket arrangement 47.

As is shown in FIG. 3, the air gun 44 is held in position by means of a bracket assembly 58 mounted on the outside wall 110 of the frame 24. A bracket member 62 is mounted on wall 110 by means of a pair of bolts 64. An L-shaped rod 66 is removable and adjustably mounted in an aperture 68 in bracket member 62 and held therein by a manually tightened bolt 70. The spray gun is mounted on the free end of the L-shaped rod so that it is slidable therealong. Clamp member 72 serves to secure the air gun in a fixed position on the rod 66. Thus, a vertical adjustment of the gun is possible by moving the rod 66 in relation to bracket 62, and a horizontal adjustment of the air gun is possible by moving the clamp 72 holding the gun 44, along th the rod 66.

The air gun 44 is also connected by means of an air line 74 to a cam operated trigger mechanism 76 mounted on frame 24 by means of a bracket arrangement 77, which serves to supply pressurized air to the air gun 44 to operate the latter. A source of air under pressure (not shown) is connected via line 78 to the air bleeder valve 80 of the trigger mechanism 76.

The cam operated trigger mechanism is shown in FIG. 4 in more detail and includes a support bracket 82. A triangular shaped cam plate 84 is pivotally mounted at one corner 86 thereof to the bracket 82 by means of a pin 88. A second corner of the cam plate includes a cutout 90 which is movable into and out of engagement with an eccentric pin member 92. The pin member 92 is rotatably mounted on bracket 82 and is manually movable in such a manner by means of a handle 94 attached thereto. The cam plate is held toward the eccentric and generally steadied by means of a spring 98 which is mounted between a pair of pins 100 and 102, also connected to bracket 82 and extending upwardly therefrom (FIG. 4). The edge 96 of the triangular cam plate which forms the hypotenuse thereof, extends outwardly into the path of movement of the spindles 22, and engages the latter as they move past the cam plate.

A valve pin 104 which extends outwardly from bleeder valve 80 (FIG. 4) rests against the edge 106 of the cam plate opposite that of the hypotenuse 96. Thus, as a spindle 22 engages edge 96, the cam plate is pivoted toward eccentric 92. As the cam plate moves about pivot pin 88, valve pin 104 is forced inwardly into valve 80. The operation of pin 104 opens valve 80 to release a quantity of pressurized air from the source via line 74 to air gun 44. The rushing air through the spray gun causes a quantity of oil, determined by the setting of micrometer knob 46, to be drawn via line 48 from reservoir 52 into gun 44. The air gun in turn directs the atomized oil, the consistency of which is adjusted by micrometer control knob 47, toward another spindle 22 preceding the spindle which activated cam plate 84 (FIG. 2), thereby to lubricate the preceding spindle, as shown in FIG. 5. 8

The eccentric 92 may be rotated by handle 94, so that a shoulder portion 108 thereof is turned to engage cam plate 84. In this case, the cam plate is unable to move pin 104 as the spindles 22 pass, and the operation of the oiling apparatus is thereby interrupted.

Referring to FIGS. 5 and 6, there is illustrated therein, in greater detail, a spindle 22 which is lubricated by device 12 according to the invention. As can be seen in the FIGS. the conveyor frame 24 includes a pair of upstanding side members 110 and 112 which are provided at their upper ends with inturned flanges 114 and 116 that terminate in downturned ends 118 and 120, respectively. The trigger mechanism 76 is shown mounted on flange 116 with cam plate 84 extending outwardly therefrom to engage spindle 22. A channel 124 formed from two L-shaped members 126 and 128 which have been connected by welding or other suitable means, supported by a member 129 (FIG. 3), is provided between members 110 and 112 as a guide for conveyor chain 29 of conveyor 20. The conveyor chain 29 includes the usual plurality of chain shafts 132 which serve to interconnect the various links of the chain. The chain includes links 134, 136, 138 and 140, links 136 and 138 extending out of the page, as illustrated in FIG. 5, and links 134 and 140 extending into the page. The links are separated by a spacer 142 and are held on the shaft or pin 132 by a cotter pin 144. The links alternate around the chain to form the continuous flexible conveyor chain member 29.

Mounted on shaft 132 of the chain is a cylindrical sleeve member 146. Fixed to the member 146 is a pulley 148. The pulley is force-fitted over knurled section 150 to secure the pulley to member 146. A washer 151 separates pulley 148 and link 134 of the conveyor chain. Pulley 148 is adapted to engage belt arrangement 42 (FIG. 1), thereby to rotate the article (not shown in FIG. 5) being supported on spindle 22. An outer sleeve 152 fits over the cylindrical member 146 and rests against pulley constituting said member 146 an inner sleeve member. pair of flat links, 153, 155 are mounted on member 146 with a collar 154 provided thereover. Links 153 and 155 serve to protect persons from placing their hands or fingers into the moving conveyor chain. The upper portion 156 of the member 146 is tapered in the shape of a truncated cone, and a removable support member 158 which serves to hold articles to be air-coated is mounted thereon.

As can be seen in FIGS. 5 and 6, there is a space 160 provided between collar 154 and sleeve 152. This space 160 is defined by the underside of link 155, the endface 161 of the outer sleeve 152 and the outer cylindrical surface of sleeve member 146. It is in this space that lubricant from the gun 44 of the lubricating device 12 according to the invention is automatically ejected as the spindle 22 passes the gun. Further, it should be noted that the endface 161 of sleeve 152 is recessed to provide a reservoir for the oil. In the illustrated embodiment, endface 161 is frustoconical, converging radially inward toward the inner sleeve 146 so that the oil will be directed toward the inner face of the respective sleeve members 146 and 152.

Turning now to FIG. 6, the nozzle 164 of the air gun 44 can be seen positioned adjacent the space or opening 160 between collar 154 and sleeve 152 of spindle 22. A quantity of oil from gun 44 is received into opening 160 and flows, as indicated by the arrows, into space 166 provided between cylindrical inner member 146 and the outer sleeve 152. A downwardly inclined opening 168 is provided in member 146 so that the lubricating oil may pass therethrough toward pin 132. A portion of the oil, however, bypasses the inclined opening and continues to flow downwardly, due to gravity, between sleeve 156 and member 146 until it reaches pulley 148.

The quantity of oil which flows into inclined opening 168 passes to the bearing surfaces between pin 132 and the inner wall 170 of member 146. The oil continues downwardly between washer 151 and pin 132, and over links 134, 136, spacer 142 and links 138 and 140. This provides adequate lubrication between the sprocket wheel 40 and the chain conveyor 29 upon engagement thereof.

Because the belt arrangement 42 engages pulley 148 to rotate the spindle 22, member 146 is in turn rotated about pin 132. This insures that the oil or lubricant from air gun 44 will be thoroughly and efficiently spread over the entire area of pin 132 and inner wall 170 of member 146. Furthermore, because sleeve 152 is able to rotate about member 146 upon engaging cam 84 of trigger mechanism 76, oil emanating from gun 44 is adequately spread about the inner wall 172 of sleeve 152 and the outer wall 174 of member 146. In addition, the oil seeps downwardly between the links of the conveyor chain and the guides therefor, as shown by the arrows. Thus, all engageable moving bearing surfaces of the spindle and conveyor chain are lubricated to provide efficient operation of the air-coating apparatus.

For purposes of affording a more complete understanding of the overall operation of the automatic lubricating apparatus 12 according to the invention, a functional description of the apparatus in cooperation with the air-coating apparatus 10 will now be given.

As shown in FIG. 1, the conveyor chain 29 of system 20 carries articles 30 on spindles 22 in the direction of the arrows. When it is believed that the spindles 22 and chain conveyor require an oiling, handle 94 of eccentric 92 is pivoted to position shoulder portion 108 thereof away from cam plate 84 (FIG. 4). This prepares the lubricating apparatus for operation.

As the conveyor chain 29 is driven by sprocket wheel 40 about the frame 24, spindles 22 are moved past trigger mechanism 76. As a spindle 22 passes cam 84, which extends outwardly into the path thereof, cam 84 engages sleeve 152 of the spindle. The engagement of the two causes cam 84 to be pivoted about pin 88 so as to depress pin 104 into bleeder valve 80. This causes a quantity of atomized oil, predetermined by the setting of micrometer control knob 46, to be released from air gun 44 alined with a spindle which is at that time engaging the trigger mechanism 76. The air gun 44, as explained heretofore, is positioned so as to eject the oil in a consistency determined by the micrometer control knob 47 which serves to adjust the jet opening of the gun into opening 160 between collar 154 and sleeve 152. The preset quantity of oil ejected from the air gun flows over the spindle 22 as described above.

After the spindle which operated trigger mechanism 76 passes, cam 84 is released and pin 104 is extended outwardly from bleeder valve 80 to return the cam 84 to its original position. When the following spindle arrives at the location of cam 84, it too engages the cam to continue the lubricating operation. When the spindles have been lubricated satisfactorily, the eccentric 92 is returned to its original position, with shoulder 108 engaging the cam plate 84 in cutout 90, to prevent further operation of the lubricating device. When the time arrives for additional lubrication, the above-described operation is repeated.

Thus, the automatic lubricating device provides an accurate, efficient way of thoroughly lubricating the moving, rotatable support spindles while the air-coating system is in operation. Because of the micrometer adjustments both for the quantity of oil provided each time the bleeder valve is operated and the consistency of the jet emanating from the air gun, an accurate, predetermined quantity of oil is able to be placed at exactly the correct location with respect to the moving spindles without wasting oil and without causing a permeation of oil vapor about the air coating apparatus.

While a particular embodiment of the invention has been shown and described, it should be understood that the invention is not limited thereto, since many modifications may be made. It is therefore contemplated to cover by the present application any and all such modifications as fall within the true spirit and scope of the appended claims.

It is claimed:

1. In combination, an article conveyor system comprising a moving element having a plurality of support members, and automatic lubricating apparatus for individually lubricating said support members, said apparatus including spray means mounted adjacent said moving element and connectable to a source of lubricant, and actuating means connected to said spray means for operating said spray means upon alinement of one of said support members with said spray means, thereby to emit a quantity of lubricant onto said one support member, each said support member including a spindle arrangement carrying said article being conveyed, said spindle arrangement having a pin element and a sleeve assembly rotatably mounted coaxially with said pin element, said sleeve assembly including wall structure defining a reservoir which is alined with the spray means upon actuation thereof to receive a quantity of oil, and passage means formed by said wall structure operatively connecting said reservoir with the bearing surfaces of said pin element whereby oil is delivered thereto.

2. The combination as defined in claim 1 wherein said sleeve assembly includes a first, inner sleeve member and a second outer sleeve member coaxially mounted to said first sleeve member, and said reservoir for the reception of oil being defined by a recess formed in the endface of the second sleeve member.

3. The combination as defined in claim 2 wherein the endface of said outer sleeve member is frustoconical and converges radially inward toward the axis thereof.

4. The combination as defined in claim 2 wherein said second, outer sleeve member is rotatably mounted upon said first inner sleeve member, and the endface of said second sleeve member cooperates with said first sleeve member to define said reservoir.

5. The combination as defined in claim 1 wherein said sleeve assembly includes a first, inner sleeve member and a second, outer sleeve member coaxially mounted thereon, said reservoir for the reception of oil being defined partially by the endface of said outer sleeve member, and said passage means including an opening formed in said inner sleeve member so that oil can flow from said reservoir to the interior of said inner sleeve member to lubricate the bearing surfaces of said pin element.

6. The combination as defined in claim 5 wherein said endface of the outer sleeve member is recessed to provide said reservoir.

7. The combination as claimed in claim 1 wherein said moving element includes an endless conveyor element having said support members mounted thereon in spaced-apart fashion therealong, and wherein said spray means includes an air gun connectable to an oil reservoir.

8. The combination as defined in claim 7 wherein said actuating means includes an air valve coupled with a source of pressurized air, mounted adjacent said conveyor element, and having a cam member connected in operable relation with said air valve, said cam member extending outwardly into the path of said conveyor element so as to engage said support members as the latter pass said cam member, said cam member, upon the engagement thereof by one of said support members, causing said air valve to be opened, releasing a quantity of pressurized air to said air gun, whereby said air gun ejects a predetermined quantity of atomized oil onto a support member alined therewith.

9. The combination as claimed in claim 1 wherein said spray means includes first micrometer adjustment for adjusting the quantity of lubricant to be ejected toward said support members and second micrometer adjustment means for controlling the consistency of the spray of said lubricant being emitted from said spray means.

10. The combination as defined in claim 1 wherein said conveyor system includes means engageable with said sleeve assemblies for rotating said assemblies along a predetermined portion of the path of travel thereof, whereby the rotation of said assemblies serves to distribute the oil sprayed thereon to lubricate thoroughly the bearing surface of the said assemblies.

11. The combination as claimed in claim 1 wherein said conveyor system comprises a chain conveyor having a plurality of interconnected links, and wherein each of said pin elements of said spindle arrangements is removably mounted in a pair of adjoining links and thereby serves as a link coupler.

12. The combination as claimed in claim 1 wherein said automatic lubricating apparatus further includes means for minutely adjusting the quantity of oil to be emitted from said spray means onto said moving spindle arrangements.

13. The combination as claimed in claim 1 wherein said automatic lubricating apparatus further includes means for minutely adjusting the consistency of the spray of atomized oil emanating from spray means gun.

UNITED STATES PATENT OFFICE
CERTIFICATE OF CORRECTION

Patent No. 3,543,882    Dated December 1, 1970

Inventor(s)    Jens A. Paasche

It is certified that error appears in the above-identified patent and that said Letters Patent are hereby corrected as shown below:

Column 1, line 19, before "loss" omit --loo--;

Column 3, line 15, after "FIG. 5," omit --8--;

Column 3, line 51, after "pulley" insert --148, thus,--;

Column 3, line 52, before "pair" insert --A--; and

Column 6, line 49, after "from" insert -- said --, and after "means" cancel "gun".

Signed and sealed this 13th day of July 1971.

(SEAL)
Attest:

EDWARD M. FLETCHER, JR.                WILLIAM E. SCHUYLER, JI
Attesting Officer                      Commissioner of Patent: